United States Patent [19]
Lee et al.

[11] Patent Number: 4,575,671
[45] Date of Patent: Mar. 11, 1986

[54] METHODS AND APPARATUS FOR SYNCHRONIZING MULTIPLE MOTOR DRIVEN GENERATORS

[75] Inventors: Robert H. Lee, Fullerton; Suresh C. Gupta, Los Alamitos, both of Calif.

[73] Assignee: Teledyne Industries, Inc., Los Angeles, Calif.

[21] Appl. No.: 580,143

[22] Filed: Feb. 14, 1984

[51] Int. Cl.⁴ .......................... H02J 1/00; H02P 9/00
[52] U.S. Cl. ...................................... 322/16; 307/84; 307/87; 322/29; 322/39
[58] Field of Search .................. 322/13, 16, 29, 39, 322/32; 307/84, 87

[56] References Cited
U.S. PATENT DOCUMENTS

2,728,865 12/1955 Day et al. .................. 322/13 X
3,975,646 8/1976 Kilgore et al. ............... 322/32 X
4,074,180 2/1978 Sharpe et al. ................ 307/84 X Primary Examiner—R. J. Hickey
Attorney, Agent, or Firm—Reagin & King

[57] ABSTRACT

Methods and apparatus are disclosed for synchronizing multiple AC motor driven synchronous generators to the voltage on a common output bus. In one method, the rotating motor is disconnected from its AC power source, the generator voltage is phase synchronized to the output bus voltage, and then the generator rotor is caused to slip one generator pole at a time until the motor generated voltage is phase synchronized to the AC power source voltage. At that point, the motor is reconnected to the AC power source. Other methods are disclosed in which magnetic position sensors are employed to provide an indication of when the rotors on multiple motor driven generators are mechanically phase synchronized.

9 Claims, 2 Drawing Figures

METHODS AND APPARATUS FOR SYNCHRONIZING MULTIPLE MOTOR DRIVEN GENERATORS

BACKGROUND OF THE INVENTION

This invention relates to methods and apparatus for synchronizing multiple electric motor driven generators and, more particularly, to methods and apparatus for connecting multiple alternating current motor driven generators to a common output bus, where the type of generator is synchronous, the type of motor is either synchronous or induction, and the motors are driven from either a common source bus, or from separate but phase-related source busses.

A wide variety of alternating current motor driven generators have been designed over the years to, for example, generate AC power having a frequency which is different from the frequency of the utility supplied AC power. A typical application for such motor driven generators is to provide four-hundred hertz power to a load when only a sixty hertz power source is available. Another application is to provide uninterrupted power to a load in the event of a short term outage of the utility supplied power. In this instance, the mechanical inertia of the rotating portions of the motor driven generator is relied upon to provide power during the outage.

In the use of motor driven generators, it is often necessary to connect more than one motor driven generator to a common output bus without interrupting power to the load. For example, it may be necessary to provide more power to the load than is available from a single generator, or it may be necessary to transfer the load from one generator to another without interrupting power to the load. When a second synchronous generator is connected to an output bus which is already carrying power from a first synchronous generator it is necessary that the output voltages of the two generators be approximately equal, and it is also necessary to make the connection at a time when the voltage from the second generator is in phase with the output bus voltage. Connecting an out-of-phase generator to the output bus can cause series disturbances to the load, as well as cause damage to the rotating elements.

The task of phase synchronizing a synchronous generator is further complicated if that generator is driven by a synchronous motor. This type of motor poses the additional constraint that it must be phase synchronized to the source voltage for proper operation. In those applications where the source frequency and the generator output frequency are not the same, phase synchronization becomes an even more difficult task.

One way in which phase synchronization of motor driven generators has been accomplished in the past is to use a mechanical alignment system. In this system, the second motor driven generator is brought up to speed, and the motor stator is then physically rotated with respect to the generator stator. This rotation has the effect of shifting the phase of the output voltage of that generator. The stator rotation is continued unitl the second generator voltage is in phase with the output bus voltage. A major problem with this arrangement is the need for complicated and expensive mechanical apparatus such as bearings, gearboxes, control motors and control logic. Generally, this type of mechanical alignment system is limited to vertical motor driven generator configurations in which the motor is mounted above the generator. Horizontal configurations create difficult alignment and support problems with respect to providing a rotatable motor stator.

Accordingly, it is an object of the present invention to provide new and improved methods and apparatus for synchronizing multiple motor driven generators.

It is another object of the present invention to provide methods and apparatus for synchronizing multiple motor driven generators which do not require rotatable stators.

It is yet another object of the present invention to provide methods and apparatus for synchronizing multiple motor driven generators using a microprocessor control system.

SUMMARY OF THE INVENTION

The foregoing and other objects of the invention are accomplished by providing a method of synchronizing an AC motor driven multi-pole synchronous AC generator to an AC voltage on an output bus. The method includes the following steps:

(A) connecting the motor to an AC power source;

(B) permitting the motor driven generator to reach operating speed, whereby the generator produces a voltage having an amplitude and frequency substantially equal to the amplitude and frequency of the output bus voltage;

(C) disconnecting the motor from the AC power source, whereby the motor driven generator begins to slow down;

(D) comparing the phase of the generator voltage with the phase of the output bus voltage;

(E) connecting the generator to the output bus when the difference between the phase of the generator voltage and the phase of the output bus voltage is within a predetermined output phase tolerance, whereby the generator voltage is phase locked to the output bus voltage and the generator is driven by the output bus power;

(F) comparing the phase of the AC power source voltage to the phase of the AC voltage generated by the motor as it is being driven by the generator, which is acting as a motor.

(G) reconnecting the motor to the AC power source only if the difference between the phase of the motor voltage and the phase of the source voltage is within a predetermined input phase tolerance, at which time the motor driven generator is synchronized both to the output bus voltage and the source voltage;

(H) disconnecting the generator from the output bus if the difference between the phase of the motor voltage and the phase of the source voltage is not within the predetermined input phase tolerance, whereby the motor driven generator begins to slow down;

(I) reconnecting the generator to the output bus when the difference between the phase of the generator voltage and the phase of the output bus voltage is within the predetermined output phase tolerance, whereby the generator voltage is again synchronized to the output bus voltage but the position of the generator rotor as a function of time has been slipped one pole pair with respect to its position when the generator was last connected to the output bus; and (J) repeating steps F through I until the phase criterion recited in step G is met.

In another embodiment of the invention, a method is provided for synchronizing a second AC motor driven multi-pole synchronous generator to an AC voltage on an output bus. The output bus voltage is supplied by a first AC motor driven multi-pole synchronous generator. The motor of the second motor driven generator is powered from an AC power source. The first motor driven generator includes a first position indicator which provides a first indication each time the first generator rotor is at a first predetermined rotational position relative to the first generator stator.

All of the motor driven generators have their motor and generator stators oriented so that there is at least one particular mechanical phase angle between the generator rotor and stator at which the difference between the phase of the motor voltage created when the second motor is driven as a generator and the phase of the source voltage is within a predetermined input phase tolerance when the difference between the phase of the second generator voltage and the phase of the output bus voltage is within a predeterminec output phase tolerance. The second motor driven generator includes a second position indicator which provides a second indication each time the second generator rotor is at a second predetermined rotational position relative to the second generator stator. The second predetermined rotational position is chosen so that when the first and second indications occur at the same points in time, the second generator rotor is at the particular mechanical phase angle relative to the generator stator. The method includes the following steps:

(A) connecting the second motor to the AC power source;

(B) permitting the second motor driven generator to reach operating speed, whereby the second generator produces a voltage having an amplitude and frequency substantially equal to the amplitude and frequency of the output bus voltage.

(C) comparing the time of occurrence of the first indication with the time of occurrence of the second indication;

(D) disconnecting the second motor from the AC power source if the difference between the time of occurrence of the first indication and the time of occurrence of the second indication is not within a predetermined interval of time, whereby the second motor driven generator begins to slow down;

(E) comparing the phase of the AC power source voltage to the phase of the second motor voltage generated by the rotating second motor rotor;

(F) reconnecting the second motor to the AC power source when the difference between the phase of the AC power source voltage and the phase of the second motor voltage is within a predetermined input phase tolerance, whereby the second motor is again synchronized to the AC power source voltage but the position of the second motor rotor as a function of time has been slipped one motor pole with respect to its position when the second motor was last connected to the AC power source;

(G) repeating steps C through F until the difference between the time of occurrence of the first indication and the time of occurrence of the second indication is within the predetermined interval of time;

(H) disconnecting the second motor from the AC power source;

(I) comparing the phase of the generator voltage with the phase of the output bus voltage;

(J) connecting the second generator to the output bus when the phase of the second generator voltage and the phase of the output bus voltage is within a predetermined output phase tolerance;

(K) reconnecting the second motor to the AC power source.

These and other objects, advantages and features of the invention will become apparent from a reading of the specification in conjunction with the drawings in which like elements are designated by like numerals throughout the several figures.

DESCRIPTION OF THE PREFERRED EMBODIMENTS

Figure 1:
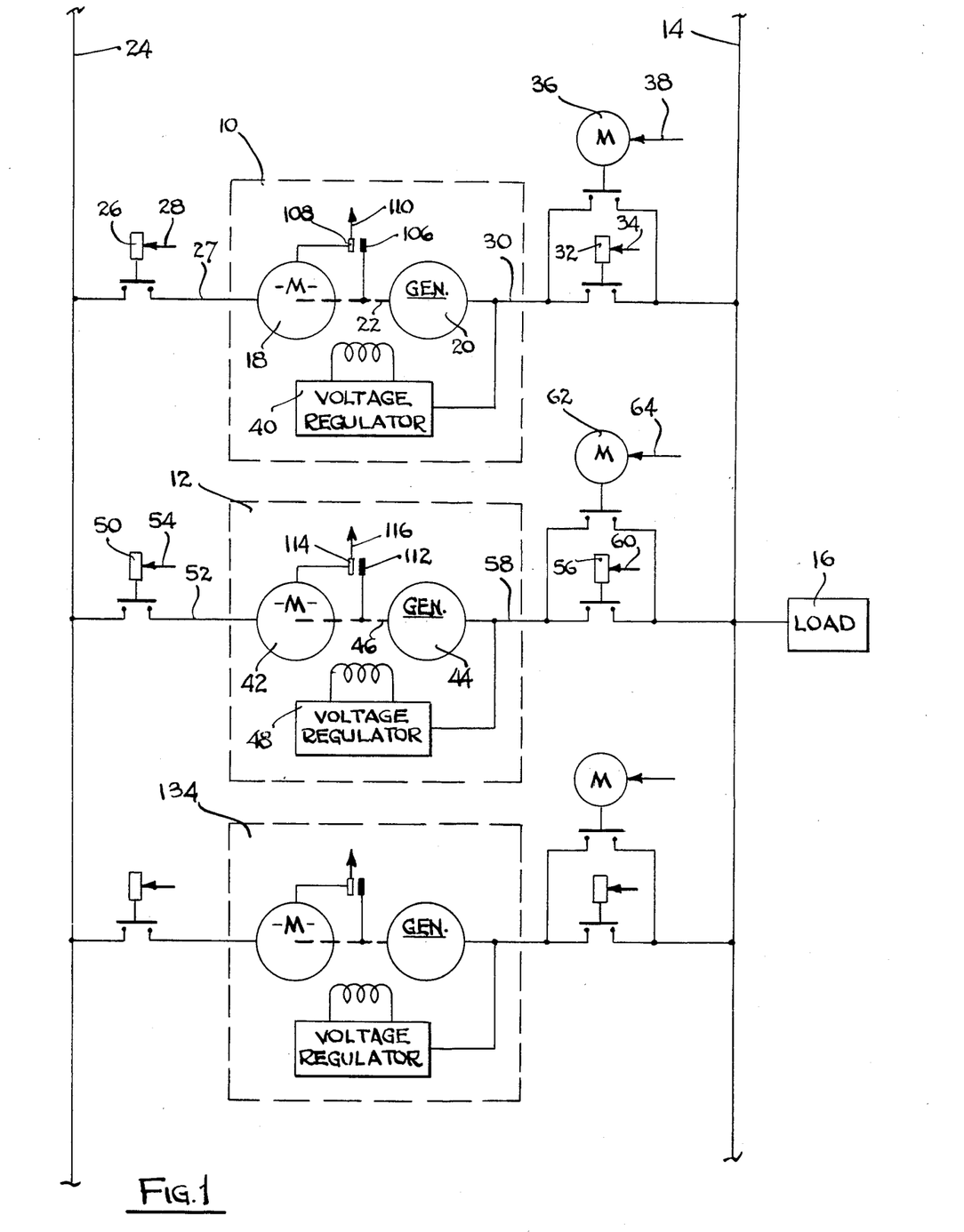
FIG. 1 is a schematic diagram showing the circuits used to synchronously connect multiple motor driven generators to a single output bus in accordance with the teachings of the invention.

Referring to FIG. 1, there is a schematic diagram showing the circuits used to connect first and second AC motor driven generators 10 and 12, respectively, to a common output bus 14 to supply power to a load 16. The first motor driven generator 10 includes an AC motor 18 and a synchronous multi-pole AC generator 20. The rotors of the motor 18 and the generator 20 are mounted to a common shaft 22 or are connected by a coupling which locks the rotational relationship between motor and generator. Alternately a speed changing mechanism may couple the motor and generator. The motor 18 is powered from an AC power source provided on a source bus 24. A magnetically operated contactor 26 is used to connect input lines 27 of the motor 18 to the bus 24 in response to a control signal appearing on line 28.

Output lines 30 from the generator 20 are connected to the output bus 14 using a magnetically operated contactor 32 which is responsive to a control signal appearing on line 34. Connected in parallel with the contactor 32 is a high-current motor-operated switch 36 which is responsive to a control signal appearing on line 38. A voltage regulator 40 is provided as part of the motor driven generator 10, and is used to control the magnitude of the voltage appearing on the generator output lines 30 in a manner well known to those skilled in the art. This same regulator, or a second source of DC power is used to excite the synchronous motor.

The motor driven generator 12, comprising motor 42, generator 44, rotor shaft 46 and voltage regulator 48, is substantially identical in construction to the motor driven generator 10. The motor driven generator 12 is connected between the source bus 24 and the output bus 14 in the same manner as previously described for the motor driven generator 10. Accordingly, a magnetically operated contactor 50 is used to connect the motor 42 input lines 52 to the bus 24 in response to a control signal on line 54. A magnetically operated contactor 56 is used to connect the generator 44 output lines 58 to the output bus 14 in response to a control signal on line 60. Connected in parallel with the contactor 56 is a high-current motor-actuated switch 62 which is responsive to a control signal on line 64.

Figure 2:
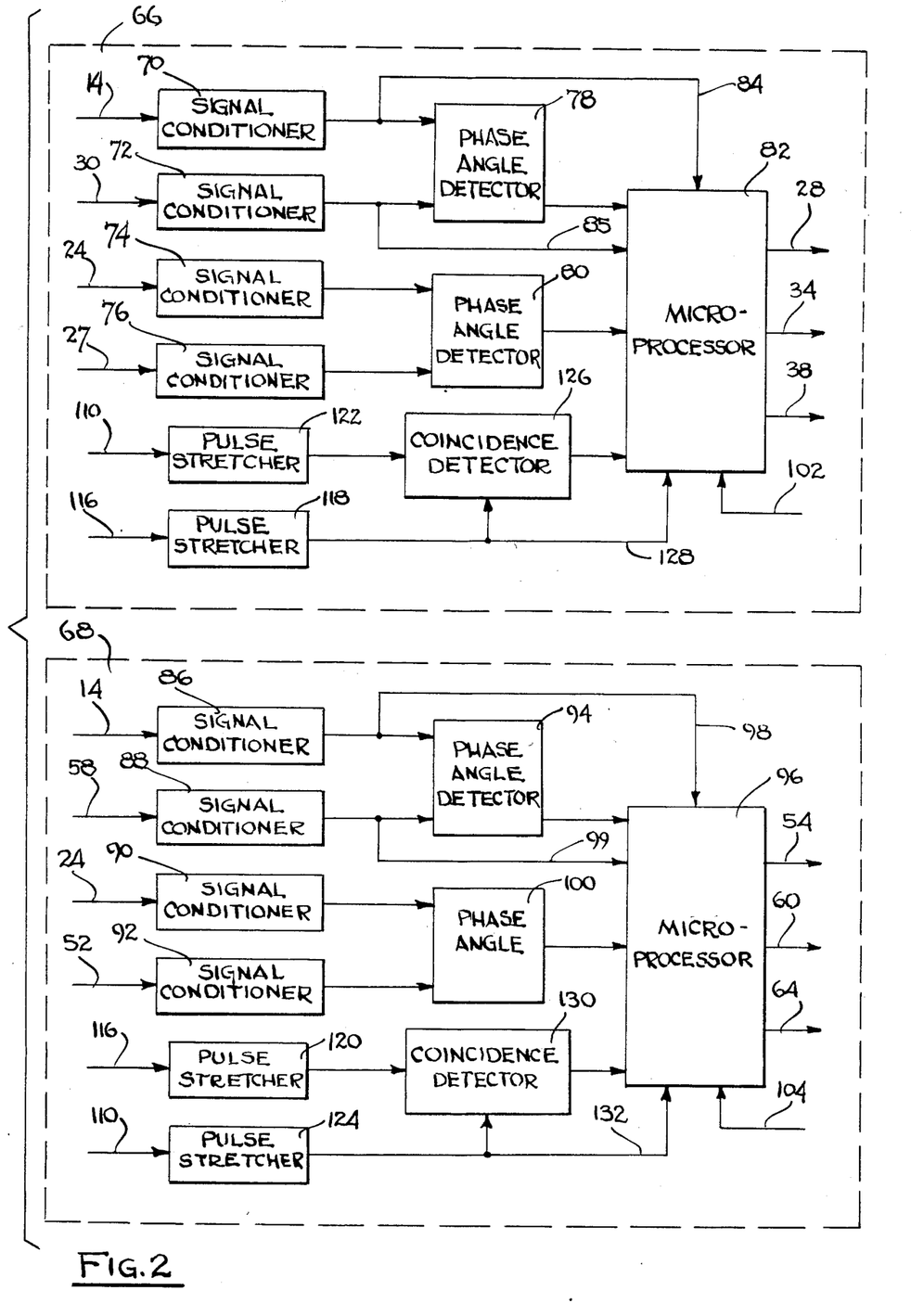
FIG. 2 is a block diagram showing the control systems used to operate the circuits of FIG. 1 in accordance with the methods of the invention.

Referring to FIG. 2 there is shown a block diagram of the control system used to control the circuitry of FIG. 1. The control system shown within block 66 is used to control the operation of the motor driven generator 10, while the control system shown within the block 68 is used to control the operation of the motor driven generator 12.

The control system 66 is provided with input signals which include the voltage appearing on the output bus 14, the voltage appearing on the output lines 30 of the generator 20, the voltage appearing on the source bus 24, and the voltage appearing on the input lines 27 of the motor 18. These signals are provided to input terminals of signal conditioner circuits 70, 72, 74 and 76, respectively. These circuits each include a voltage divider to lower the amplitude of the signals, and a buffer amplifier to provide an output signal.

The output signals from the conditioners 70 and 72 are provided as input signals to a phase angle detector 78, and the output signals from the conditioners 74 and 76 are provided as input signals to a phase angle detector 80. The detector 78 performs the function of comparing the phase of the voltage appearing on the load bus 14 with the voltage appearing on the output lines 30 of the generator 20. If the difference between the phases of these two voltages is within a predetermined output phase tolerance, the detector 78 provides a signal to a microprocessor 82. The signal from the conditioner 70, which represents the voltage appearing on the load bus 14, is provided to the microprocessor 82 on line 84, and the signal from the conditioner 72, which represents the voltage appearing on the generator output lines 30 is provided on the line 85. The detector 80 performs the function of comparing the phase of the voltage appearing on the source bus 24 with the phase of the voltage appearing on the input lines 27 of the motor 18. If the difference between the phases of these two voltages is within a predetermined input phase tolerance, the detector 80 provides an input signal to the microprocessor 82. The microprocessor 82, in turn, provides control signals on the lines 28, 34, and 38 to control, respectively, the contactors 26 and 32, and the motor-operated switch 36.

The control system in block 68 operates in an identical manner to the operation of the system 66 described above, except that it monitors and controls the operation of the motor driven generator 12. The control system 68 is provided with input signals which include the voltage appearing on the output bus 14, the voltage appearing on the output lines 58 of the generator 44, the voltage appearing on the source bus 24, and the voltage appearing on the input lines 52 of the motor 42. Signal conditioners 86, 88, 90 and 92 perform fuctions analogous to the conditioners 70, 72, 74 and 76, respectively. Phase angle detector 94 compares the phase of the voltage appearing on the output bus 14 with the phase of the voltage appearing on the output lines 58 of the generator 44. If the difference between the phases of these two voltages is within a predetermined output phase tolerance, the detector 94 provides an input signal to a microprocessor 96. The signal from the conditioner 86, which represents the voltage appearing on the load bus 14, is provided to the microprocessor 96 on line 98 and the signal from the conditioner 88, which represents the voltage on the generator output lines 58 is also provided on the line 99.

The detector 100 performs the function of comparing the phase of the voltage appearing on the source bus 24 with the phase of the voltage appearing on the input lines 52 of the motor 42. If the difference between the phases of these two voltages is within a predetermined input phase tolerance, the detector 100 provides an input signal to the microprocessor 96. The microprocessor 96, in turn, provides control signals on the lines 54, 60, and 64 to control, respectively, the contactors 50 and 56, and the motor-actuated switch 62. A typical microprocessor for use in the present invention is the type 6502, manufactured by Rockwell Microelectronics, Anaheim, Calif.

The control systems described above operate in conjunction with the circuits shown in FIG. 1 to synchronize the operation of the motor driven generators 10 and 12 in the following manner. Assume by way of example that the motor driven generators 10 and 12 are constructed to provide four-hundred hertz AC power to the load 16 on the output bus 14, when supplied with sixty hertz power from the source bus 24. Further assume that the generators 20 and 44 are each constructed as forty-pole synchronous generators and that the motors 18 and 42 are each constructed as six-pole synchronous motors.

An object of the present invention is to enable both of the motor driven generators 10 and 12 to share the four-hundred hertz power supplied to the load 16 while operating from sixty-hertz power from the bus 24. In order for the generators 20 and 44 to properly operate in this parallel arrangement, the generator output voltages appearing on the lines 30 and 58 must be phase synchronized. Because the motors 18 and 42 are synchronous, they too are required to operate in phase synchronism with the source voltage 24. In order to ensure that the synchronous motor driven generators can supply phase synchronized voltages to the bus 14 while maintaining the motors 18 and 42 synchronized to the source power, it is necessary to provide a predetermined mechanical alignment between the rotors and stators in each of the motor driven generators 10 and 12.

The motor driven generators 10 and 12 are each constructed with the motor and generator rotors affixed to a common shaft, 22 and 46, respectively.

During the construction of the motor driven generator 10, in order to establish a known phase relationship between the phase of the source voltage powering the motor 18 and the phase of the voltage generated by the generator 20, the motor driven generator 10 is provided with source power and allowed to reach operating speed as part of an alignment procedure. The source voltage powering the motor 18 is then monitored along with the output voltage of the generator 10. An arbitrary phase relationship between these two voltages is chosen as an alignment criterion. For example, it is convenient to choose the criterion that the source voltage and the generator output voltage pass through zero at the same time (zero degree phase alignment) at least once per revolution of the rotor. In order to meet this criterion the motor stator is slowly rotated with respect to the generator stator until the desired phase alignment is accomplished. At that point the motor stator is fixed in position, and the motor driven generator 10 is thus phase aligned.

The identical alignment procedure described above for the motor driven generator 10 is also performed during the construction of the motor driven generator 12 and any other motor driven generators which are to be operated in parallel between common source and output busses. It should be noted that the alignment procedure may be accomplished in a number of different ways. For example, the generator stator may be rotated with respect to the motor stator, or the motor rotor may be shifted in angular position relative to the generator rotor. This might be accomplished by providing the rotors on seperate shafts which are coupled together in a manner which permits the shafts to be shifted in angular position relative to each other. The mechanical alignment methods of the type described above are well known to those skilled in the art.

It should also be noted that the alignment of the motor driven generator 10 and the motor driven generator 12 are identical only if both motor driven generators are to be powered from the same AC power source. For example, it is conceivable that the motor driven generator 12 might be powered from a second sixty hertz source other than that appearing on the source bus 24, where this second source is phase displaced from the source appearing on the bus 24. In this instance, the alignment of the motor driven generator 12 must account for this phase displacement of the source voltages and adjust the relative positions of the motor and generator stators adjusted accordingly. The object of the alignment of the motor driven generator 12 is to insure that when the motor 42 is synchronized to the source driving it, there is at least one mechanical phase angle of the generator 44 rotor relative to the stator (or of the motor rotor relative to the motor stator) at which the generator output voltage will be phase synchronized to the voltage on the output bus 14.

Continuing with the example, assume that the motor driven generators 10 and 12 are not energized and that no power is being supplied to the load 16. Accordingly, the contactors 26, 32, 50 and 56, as well as the motor activated switches 36 and 62, are all open. In order to provide power to the load 16 from the motor driven generator 10, a start signal is provided on line 102 to the microprocessor 82. The microprocessor 82 provides a signal on the line 28 which closes the contactor 26 and provides power to the motor 18 from the source bus 24. When the motor 18 reaches synchronous speed, the regulator 40 controls the voltage appearing on the lines 30 from the generator 20. The microprocessor 82 monitors this voltage on its input line 85 and also monitors the output bus voltage on its input line 84. Since the output bus voltage is zero, the microprocessor 82 is informed that the motor driven generator 10 is the first generator to be brought on line and there is no need to synchronize it to the output bus voltage. Accordingly, if the generator 20 output voltage is properly regulated between predetermined limits, the microprocessor provides a signal on the line 38 which closes the motor actuated switch 36 and provides power from the generator 10 to the load 16.

Assume now that it is desirable to furnish additional power to the load from motor driven generator 12. A start signal is provided to the microprocessor 96 on line 104. A signal is then provided on the line 54 to close contactor 50, which causes the motor 42 to accelerate to synchronous speed. When the motor driven generator 12 is at operating speed, the regulator 48 controls the generator voltage appearing on the line 58. The microprocessor 96 determines, by monitoring the signal on the line 98, that the motor driven generator 12 is not the first generator supplying power to the bus 14, and accordingly provides a sequence of events designed to synchronize the motor driven generator both to the output bus voltage and to the source voltage. This sequence is as follows.

The microprocessor 96 compares the amplitude and frequency of the voltage appearing on the line 58 with the amplitude and frequency of the voltage appearing on the output bus 14 to verify that the generator 44 is operating properly. If the amplitude and frequency of the two voltages are not substantially similar, contactor 50 is opened and the synchronizing sequence is aborted. Assuming proper generator operation, the processor 96 opens the contactor 50, causing the motor driven generator 12 to slow down. During the slow down, the phase of the generator voltage appearing on the bus 58 shifts slowly with respect to the phase of voltage on the output bus 14. When the difference between the phases of these two voltages is within the output phase tolerance (typically seven degrees), as sensed by detector 94, the processor 96 closes contactor 56. The contactor 56 closes in about ten to thirty milliseconds, which is sufficiently fast to prevent the phase difference from drifting more than a few degrees during the closure time interval.

At this point in time, the generator 44 becomes phase locked to the voltage on the output bus 14, and is driven at synchronous speed by the power from the generator 20. The motor 42, which now acts as a generator, produces a voltage on the line 52. The phase of this voltage is compared to the phase of the source voltage appearing on the bus 24 by the comparator 100. If the difference in these phases is within the input phase tolerance (typically thirty to fifty degrees), the contactor 50 is reclosed and the motor 42 locks into synchronization with the source voltage. At this point in time, the motor driven generator 12 is fully synchronized both to the source and output voltages. The high-current motor-actuated switch 62, which is too slow to be used during the synchronizing procedure, is now closed to provide a high-current carrying path in the load circuit.

If the phase difference between the source and motor voltages is not within the input phase tolerance, the contactor 50 is not reclosed. Instead, the contactor 56 is opened, and the generator 44 is allowed to slow down until the difference in phase between the generator voltage and the output bus voltage is again within the output phase tolerance. At this point in time, the contactor 56 is closed, and the generator is again synchronized to the output bus voltage. However, the relative position of the generator rotor as a function of time has been slipped one generator pole pair with respect to its position when the generator 44 was last connected to the output bus 14. In order to insure that the generator 44 has indeed slipped one pole pair position, it is desirable to provide a time delay, (typically one-half to one and one-half seconds), between the opening and closing of the contactor 56. When the generator 44 is resynchronized, the phase difference between the source and motor voltages is again checked to determine if it is within the input phase tolerance. If it is not, the process of slipping the generator rotor one pole at a time is repeated until the input phase criteria is met. Upon this occurrence, the contactor 50 is closed, as described above.

It should be noted that the input phase tolerance is chosen large enough to account for the fact that the motor driven generator 10 is under load (supplying power to the load 16) while the generator 44 is unloaded during the synchronizing procedure. Accordingly, there will be a difference of several degrees between the phase synchronization of the two machines. This is so because the prior mechanical alignment of the two machines was performed with both machines unloaded.

The above described synchronization method has been explained using an example where the number of generator poles (forty) is not a whole number multiple of the number of motor poles (six). In this instance, it may be shown that there is only one mechanical phase angle of the rotor relative to the stator at which the motor driven generator 12 will be synchronized to the motor driven generator 10. Accordingly, it is possible that the sequence of steps to achieve synchronization may require as many as twenty iterations before synchronization is achieved.

In the instance where the number of generator poles is a whole number multiple of the number of motor poles (for example, forty generator poles and five motor poles), it may be shown that there is more than one mechanical phase angle of the rotor relative to the stator at which the motor driven generator 12 will be synchronized to the motor driven generator 10. In this case, the maximum number of iterations to achieve synchronization is greatly reduced.

The above described synchronization method may also be used when the motors 18 and 42 are of the induction type, as opposed to the synchronous type. In this configuration, there is no need to perform the mechanical alignment procedure described above. This is so because the induction motor is not synchronous with the source voltage, and hence there is no unique mechanical phase angle of the rotor in order to achieve synchronization. Thus, when induction motors are employed, synchronization of the motor driven generator 12 may be accomplished with only a single sequence of steps.

In those systems where induction motors are employed, the synchronization method described above may be adapted to enable the induction motor driven generators to supply uninterrupted power to the output bus in the event of a short-term (one half second or less) interruption of the source power. In the event of such interruption, the system would operate as follows.

Assume by way of example that the load 16 is being supplied power from the induction motor driven generator 10, which is in turn receiving power from the source bus 24. In the event of a short-term interruption of the power on the bus 24, which may be sensed by the microprocessor 82 using the detector 80, the contactor 26 is caused to open, but the motor-actuated switch 36 remains closed. Opening the contactor 26 minimizes the load on the motor 18, which would otherwise act as a generator attempting to power the loads connected to the bus 24.

When power is restored to the bus 24, the processor 82 monitors the difference between the phases of the source voltage and the motor input voltage using the detector 80. When this difference is within the input phase tolerance, the contactor 26 is closed, and the induction motor 18 is accelerated to operating speed with minimum electrical disturbance on the buses 24 and 14.

Returning to the instance where the machines 10 and 12 are both equipped with multi-pole synchronous motors, several alternate embodiments of the invention are now described. In one alternate embodiment of the invention, the motor driven generators 10 and 12 are equipped with position sensors which provide an indication when the respective rotors are in a predetermined position relative to their stators. As described previously, the motor driven generators 10 and 12 are each aligned in a particular manner to insure synchronization both to the source and the output voltages. In the below described alternate embodiments, the motor driven generator 10 is equipped with a position sensor which may be in the form of a permanent magnet 106 fastened to a portion of the rotor, such as the shaft 22, and a magnetic pickup coil 108 fastened to either stator, such as the stator of the rotor 18.

The coil 108 produces a pulse on line 110 during each revolution of the rotor as the magnet 108 moves past the coil 108. The coil 108 is mounted to the stator of the motor 18 at a predetermined alignment position from which subsequent motor driven generators will be referenced. The motor driven generator 12 is similarly equipped with a permanent magnet 112 fastened to the shaft 46, and a magnetic pickup coil 114 is fastened to either stator, such as the stator of the motor 42. The coil 114 is positioned so that when the rotor of the motor driven generator 12 is at the particular mechanical phase angle relative to the stator which causes the motor driven generator 12 to be synchronized to the motor driven generator 10, the coil 114 will produce a pulse on line 116 at the same point in time as the pulse on the line 110 by the coil 108.

The pulses provided by the coil 108 are provided as an input signal to pulse stretcher 122 in control system 66 and to pulse stretcher 124 in control system 68. In like manner, the pulses provided by the coil 114 are provided as an input signal to pulse stretcher 118 in system 66 and to pulse stretcher 120 in system 68. The stretchers 118, 120, 122 and 124 are all designed to stretch the short duration pulses provided by the coils 108 and 114 into substantially square pulses having predetermined pulse widths. The square pulses from the stretchers 122 and 118 are provided as input signals to a coincidence detector 126, and the pulse from the stretcher 118 is also provided to the processor 82 on line 128. The coincidence detector 126 is designed to provide an input signal to the processor 82 when the difference between the time of occurrence of the pulse from the coil 108 and the time of occurrence of the pulse from the coil 114 is within a predetermined interval of time. The purpose of this time interval is to account for the range of power angles which a motor generator spans from no load to full load conditions.

In like manner, the signals from the stretchers 120 and 124 are provided to coincidence detector 130, and the signal from the stretcher 124 is provided to processor 96 on line 132. The operation of the detector 130 is identical to the operation of the detector 126.

In a second embodiment of the invention, the control system just described is used to synchronize the motor driven generator 12 to the motor driven generator 10 in the following manner. For purposes of example it is again assumed that the motors 18 and 42 are six-pole sixty hertz synchronous machines and that the generators 20 and 44 are forty-pole four hundred hertz synchronous machines.

Initially, the motor driven generators 10 and 12 are not energized and hence no power is being supplied to the load 16. Accordingly, the contactors 26, 32, 50 and 56 as well as the motor actuated switches 36 and 62, are all open. In order to provide power to the load 16 from the motor driven generator 10, a start signal is provided on line 102 to the microprocessor 82. The microprocessor 82 provides a signal on the line 28 which closes the contactor 26 and provides power to the motor 18 from the source bus 24. When the motor 18 reaches synchronous speed, the regulator 40 controls the voltage appearing on the lines 30 from the generator 20. The microprocessor 82 monitors this voltage on its input line 85 and also monitors the output bus voltage on its input line 84. Since the output bus voltage is zero, the microprocessor 82 is informed that the motor driven generator 10 is the first generator to be brought on line and there is no need to synchronize it to the output bus voltage. As a safety check, the processor 96 also monitors the pulses produced by the coil 114, which are provided on the line 128, to insure that the machine 12 is not running. If the generator 20 output voltage is properly regulated between predetermined limits, the microprocessor provides a signal on the line 38 which closes the motor actuated switch 36 and provides power from the generator 20 to the load 16.

Assume now that it is desirable to furnish additional power to the load from the motor driven generator 12. A start signal is provided to the micrprocessor 96 on line 104. A signal is then provided on the line 54 to close contactor 50, which causes the motor 42 to accelerate to synchronous speed. When the motor driven generator 12 is at operating speed, the regulator 48 controls the generator voltage appearing on the line 58. The microprocessor 96 determines by monitoring the signals on the lines 98 and 132 that the motor driven generator 12 is not the first generator supplying power to the bus 14, and accordingly provides a sequence of events designed to synchronize the motor driven generator both to the output bus voltage and to the source voltage. This sequence is as follows.

The microprocessor 96 compares the amplitude and frequency of the voltage appearing on the line 58 with the amplitude and frequency of the voltage appearing on the output bus 14 to verify that the generator 44 is opeating properly. If the amplitude and frequency of the two voltages are not substantially similar, contactor 50 is opened and the synchronizing sequence is aborted. Assuming proper generator operation, the processor 96 deenergizes the contactor 50, causing the motor driven generator 12 to slow down. During the slow down, the phase of the generator voltage appearing on the bus 58 shifts slowly with respect to the phase of voltage on the output bus 14. When the difference between the phases of these two voltages is within the output phase tolerance, typically seven degrees as sensed by detector 94, the processor 96 closes contactor 56.

At this point, the generator 44 becomes synchronized to the voltage on the output bus 14, and is driven at synchronous speed by the power from the generator 20. The processor 96 then checks the signal from the detector 130 to determine if the pulse from the coils 108 and 114 are occurring within the predetermined interval of time (typically two milliseconds), which would indicate that the rotor of the machine 12 is at the proper mechanical phase to permit synchronization. If the pulses are occurring within the predetermined interval of time, the contactor 50 is reclosed and the motor 42 locks into synchronization with the same voltage. At this point, the motor driven generator 12 is fully synchronized both to the source and output voltages. The high-current motor-actuated switch 62 is now closed to provide a high-current carrying path in the load circuit.

If the pulses are not occurring within the predetermined interval of time, the contactor 50 is not reclosed. Instead, the contactor 56 is opened, and the generator 44 is allowed to slow down until the difference in phase between the generator voltage and the output voltage is again within the output phase tolerance. At this point the contactor 56 is closed, and the generator is again synchronized to the output bus voltage. However, the relative position of the generator rotor as a function of time has been slipped one generator pole with respect to its position when the generator 44 was last connected to the output bus 14. In order to insure that the generator 44 has indeed slipped one pole position, it is desirable to provide a time delay between the opening and closing of the contactor 56. When the generator 44 is resynchronized the difference in the time of occurrence of the pulses is again checked to determine if it is within the predetermined interval of time. If it is not, the process of slipping the generator rotor one pole at a time is repeated until the time interval criterion is met. At this point the contactor 50 and the motor actuated switch 62 are closed, as described above.

In a third embodiment of the invention, the central systems 66 and 68 are configured as in the previous embodiment, but microprocessors 82 and 96 are programmed to synchronize the motor driven generators 10 and 12 in a manner which accomplishes phase synchronization with fewer iterations than that of the previous embodiments.

Upon receiving a start signal on the line 102, the processor causes the contactor 26 to close and the motor 18 accelerates to synchronous speed. The processor 82 monitors the output bus voltage to insure that the motor driven generator 10 is the first to be brought onb line. As a safety check, the processor 82 also monitors pulses from the coil 114 provided on input line 128 to insure that the motor driven generator 12 is not running. If the processor verifies that the motor driven generator 10 is the first to be brought on line, the motor-actuated switch 36 is caused to close, and the generator 20 supplies power to the load 16.

When it is desired to bring the motor driven generator 12 on line, a start signal is provided to the processor 96 on the line 104. The processor 96 determines that the load is already receiving power by monitoring the load bus voltage as well as by monitoring the pulses produced by the coil 108 which are provided on the line 132. At this point, the processor 96 begins the synchronizing sequence.

The contactor 50 is caused to close, whereby the motor 42 accelerates to synchronous speed. As in the previous embodiments, the processor 96 makes suitable checks on the magnitude and frequency of the voltage produced by the generator 44 to verify proper operation of the motor driven generator 12. The processor then checks the signal from the detector 130 to determine if the pulses from the coils 108 and 114 are occurring within the predetermined interval of time, which would indicate that the rotor of the motor driven generator 12 is at the proper mechanical phase to permit synchronization.

If the pulses are not occurring within the predetermined interval of time, the processor 96 causes the contactor 50 to open, whereby the motor 42 begins to slow down and the phase of the motor voltage on the line 52 shifts slowly relative to the phase of the source voltage on the bus 24. The processor 96 then monitors the signal from the detector 100 to determine when the motor voltage and the source voltage phases are within the input phase tolerance. At this occurrence, the processor 96 recloses the contactor 50, causing the motor 42 to again be synchronized to the source voltage. However, the position of the rotor of the motor driven generator 12 as a function of time has now been slipped one motor pole with respect to its position when the motor 42 was last connected to the source bus 24. In order to insure that the motor 42 has indeed slipped one pole pair, it is desirable to provide a fixed interval of time, typically one and one-half seconds, between the opening of the contactor 50 and its subsequent reclosing.

After the contactor 50 is reclosed, the processor 96 again checks for a conicidence signal from the detector 130. In the event of no coincidence, the sequence of opening and closing the contactor 50 to cause repetitive motor pole slipping is repeated until the signal from the detector 130 is provided. Upon this occurrence, the contactor 50 is once again reopened, and the difference in phase between the generator voltage on the line 58 and the output bus voltage is checked using detector 94. When the difference in the phase of these two voltages is wiwthin the output phase tolerance, the contactor 56 is closed, which synchronizes the generator 44 to the output bus. The contactor 50 is then reclosed, whereby the motor 42 locks back into synchronization with the source voltage. As a safety check, it is desirable to verify that the signal from the detector 130 is still present (indicating that the motor 42 has not drifted past the point of synchronization) before the contactor 50 is reclosed. Finally, the motor-actuated switch 62 is closed.

It will be appreciated that the third embodiment just described accomplishes synchronization with fewer iterations than the previous embodiments. This is so because the maximum number of iterations of the synchronizing program is limited to the number of motor pole pairs (three). This is substantially fewer iterations than the previous embodiments, which could have as many as twenty iterations (the number of generator pole pairs). An additional advantage of this embodiment is that it minimizes voltage disturbances on the output bus.

While the above described synchronization methods were explained using two motor driven generators 10 and 12 as an example, the invention is not limited to the number of machines which may be syncrhonized. As shown in FIG. 1, a third motor driven generator 134 can be placed between the buses 24 and 14 and synchronized to the machines 10 and 12 in a manner analogous to that described for the machine 12. It should also be appreciated that any of the machines 10, 12 or 134 can be designated as the first one to be brought onb line, and the remaining machines can then be synchronized to that first machine.

While there have been shown and described preferred embodiments of the invention, it is to be understood that various other adaptions and modifications may be made within the spirit and scope of the invention. It is thus intended that the invention be limited in scope only by the appended claims.

What is claimed is:

1. A method of synchronizing a second synchronous motor driven multi-pole synchronous generator to an AC voltage on an output bus, where the output bus voltage is supplied by a first synchronous motor driven multi-pole synchronous generator powered from an AC power source, the motor of second motor driven generator is also powered from the AC power source, the second motor driven generator having its motor and generator stators oriented so that there is at least one particular mechanical phase angle between the second generator rotor and stator at which the difference between the phase of the second motor voltage created when the second motor acts as a generator and the phase of the source voltage is within a predetermined input phase tolerance when the difference between the phase of the second generator voltage and the phase of the output bus voltage is within a prdetermined output phase tolerance, the method comprising the steps of:

(A) connecting the motor to an AC power source;

(B) permitting the motor driven generator to reach operating speed, whereby the generator produces a generator voltage having an amplitude and frequency substantially equal to the amplitude and frequency of the output bus voltage;

(C) disconnecting the motor from the AC power source, whereby the motor driven generator begins to slow down;

(D) comparing the phase of the generator voltage with the phase of the output bus voltage;

(E) connecting the generator to the output bus when the difference between the phase of the generator voltage and the phase of the output bus voltage is within a predetermined output phase tolerance, whereby the generator voltage is synchronized to the output bus voltage and the generator is driven by the output bus power;

(F) comparing the phase of the AC power source voltage to the phase of the motor voltage generated by the motor as it is being driven by the generator;

(G) reconnecting the motor to the AC power source only if the difference between the phase of the motor voltage and the phase of the source voltage is within a predetermined input phase tolerance, whereby the motor driven generator is synchronized both to the output bus voltage and the source voltage;

(H) disconnecting the generator from the output bus if the difference between the phase of the motor voltage and the phase of the source voltage is not within the predetermined input phase tolerance, whereby the motor dirven generator begins to slow down;

(I) reconnecting the generator to the output bus when the difference between the phase of the generator voltage and the phase of the output bus voltage are within the predetermined output phase tolerance, whereby the generator voltage is again synchronized to the output bus voltage but the position of the generator rotor as a function of time has been slipped one generator pole with respect to its position when the generator was last connected to the output bus; and (J) repeating steps F through I until the phase criterrion recited in step G is met.

2. The method of claim 1 in which the step I includes the step of waiting a predetermined interval of time from generator disconnection before generator reconnection to ensure that the generator rotor has slipped one pole.

3. A method of synchronizing a second synchronous motor driven multi-pole synchronous generator to an AC voltage on an output bus, where the output bus voltage is supplied by a first synchronous motor driven multi-pole synchronous generator powered from an AC power source, the motor of the second motor driven generator is also powered from the AC power source, the first motor driven generator includes a first position indicator which provides a first indication each time the first generator rotor is at a first predetermined rotational position relative to the first generator stator, the second motor driven generator having its motor and generator stators oriented so that there is at least one particular mechanical phase angle between the second generator rotor and stator at which the difference between the phase of the second motor voltage created when the second motor acts as a generator and the phase of the source voltage is within a predetermined input phase tolerance when the difference between the phase of the second generator voltage and the phase of the output bus voltage is within a predetermined output phase tolerance, where the second motor driven generator includes a second position indicator which provides a second indication each time the second generator rotor is at a second predetermined rotational position relative to the second generator stator, and where the second predetermined rotational position is chosen so that when the first and second indications occur at the same points in time, the second generator rotor is at the particular mechanical phase angle relative to the generator stator, the method comprising the steps of:

(A) connecting the second motor to an AC power source;

(B) permitting the second motor driven generator to reach operating speed, whereby the second generator produces a generator voltage having an amplitude and frequency substantially equal to the amplitude and frequency of the output bus voltage;

(C) disconnecting the second motor from the AC power source, whereby the second motor driven generator begins to slow down;

(D) comparing the phase of the second generator voltage with the phase of the output bus voltage;

(E) connecting the second generator to the output bus when the difference between the phase of the second generator voltage and the phase of the output bus voltage is within a predetermined output phase tolerance, whereby the second generator voltage is synchronized to the output bus voltage and the second generator is driven by the output bus voltage;

(F) comparing the time of occurence of the first indication with the time of occurrence of the second indication;

(G) reconnecting the second motor to the AC power source only if the difference between the time occurrence of the first indication and the time of occurrence of the second indicaation is within a predetermined interval of time, whereby the second motor driven generator is synchronized both to the output bus voltage and the source voltage;

(H) disconnecting the second generator from the output bus if the difference between the time of occurrence of the first indication and the time of occurrence of the second indication is not within the predetermined interval of time, whereby the second motor driven generator begins to slow down;

(I) reconnecting the second generator to the output bus when the difference between the phase of the second generator voltage and the phase of the output bus voltage are within the predetermined output phase tolerance, whereby the second generator voltage is again synchronized to the output bus voltage but the position of the second generator rotor as a function of time has been slipped one generator pole with respect to its position when the second generator was last connected to the output bus; and (J) repeating steps F through I until the time criterion recited in step G is met.

4. The method of claim 3 in which the step I includes the step of waiting a predetermined interval of time from generator disconnection before generator reconnection to ensure that the generator rotor has slipped one pole.

5. A method of synchronizing a second multi-pole synchronous motor driven multi-pole synchronous generator to an AC voltage on an output bus, where the output bus voltage is supplied by a first multi-pole synchronous motor driven multi-pole synchronous generator powered from an AC power source, the motor of the second motor driven generator is also powered from the AC power source, the first motor driven generator includes a first position indicator which provides a first indication each time the first generator rotor is at a first predetermined rotational position relative to the first generator stator, the second motor driven generator having its motor and generator stators oriented so that there is at least one particular mechanical phase angle between the second generator rotor and stator at which the difference between the phase of the second motor voltage created when the second motor is acts as a generator and the phase of the source voltage is within a predetermined input phase tolerance when the difference between the phase of the second generator voltage and the phase of the output bus voltage is within a prdetermined output phase tolerance, where the second motor driven generator includes a second position indicator which provides a second indication each time the second generator rotor is at a second predetermined rotational position relative to the second generator stator, and where the second predetermined rotational position is chosen so that when the first and second indications occur at the same points in time, the second generator rotor is at the particular mechanical phase angle relative to the generator stator, the method comprising the steps of:

(A) connecting the second motor to the AC power source;

(B) permitting the second motor driven generator to reach operating speed, whereby the second generator produces a second generator voltage haveing an amplitude and frequency substantially equal to the amplitude and frequency of the output bus voltage;

(C) comparing the time of occurrence of the first indication with the time of occurrence of the second indication;

(D) disconnecting the second motor from the AC power source if the difference between the time of occurrence of the first indication and the time of occurrence of the second indication is not within a predetermined interval of time, whereby the second motor driven generator begins to slow down;

(E) comparing the phase of the AC power source voltage to the phase of the second motor voltage generated by the rotating second motor rotor;

(F) reconnecting the second motor to the AC power source when the difference between the phase of the AC power source voltage and the phase of the second motor voltage is within a predetermined input phase tolerance, whereby the second motor is again synchronized to the AC power source voltage but the position of the second motor rotor as a function of time has been slipped one motor pole with respect to its position when the second motor was last connected to the AC power source;

(G) repeating steps C through F until the difference between the time of occurrence of the first indication and the time of occurrence of the second indication is within the predetermined interval of time;

(H) disconnecting the second motor from the AC power source;

(I) comparing the phase of the generator voltage with the phase of the output bus voltage;

(J) connecting the second generator to the output bus when the phae of the second generator voltae and the phase of the output bus voltage is within a predetermined output phase tolerance; and (K) reconnecting the second motor to the AC power source.

6. The method of claim 5 in which the step F includes the step of waiting a second predetermined interval of time from second motor disconnection before second motor reconnection to ensure that the second motor rotor has slipped one pole.

7. Apparatus for synchronizing a second synchronous motor driven multi-pole synchronous generator to an AC voltage on an output bus, where the output bus voltage is supplied by a first synchronous motor driven multi-pole synchronous generator, the motors of the first and second motor driven generators are powered from a common AC power source, the second motor driven generator having its motor and generator stators oriented so that there is at least one particular mechanical phase angle between the second generator rotor and stator at which the difference between the phase of the second motor voltage created when the second motor is driven as a generator and the phase of the source voltage is within a predetermined input phase tolerance when the difference between the phase of the second generator voltage and the phase of the output bus voltage is within a predetermined output phase tolerance, the apparatus comprising:

input connector means for connecting the motor to and disconnecting the motor from an AC power source;

output connector means for connecting the generator to and disconnecting the generator from the output bus;

input phase comparator means for providing an input synchronization indication when the difference between the phase of the AC power source voltage and the phase of the motor voltage generated by the rotating motor rotor is within a predetermined input phase tolerance;

output phase comparator means for providing an output synchronization indication when the difference between the phase of the generator voltage and the phase of the output bus voltage is within a predetermined output phase tolerance; and control means responsive to the input and the output phase comparator means to control the input and output connector means to sequentially:

(A) connect the motor to an AC power source, (B) permit the motor driven generator to reach operating speed, whereby the generator produces a generator voltage having an amplitude and frequency substantially equal to the amplitude and frequency of the output bus voltage, (C) disconnect the motor from the AC power source, whereby the motor driven generator begins to slow down, (D) connect the generator to the output bus when the output synchronization signal is provided, whereby the generator voltage is synchronized to the output bus voltage and the generator is driven by the output bus voltage, (E) reconnect the motor to the AC power source only if the input synchronization signal is present, whereby the motor driven generator is synchronized both to the output bus voltage and the source voltage, (F) disconnect the generator from the output bus if the input synchronization signal is not present, whereby the motor dirven generator begins to slow down, (G) reconnect the generator to the output bus when the output synchronization signal is provided, whereby the generator voltage is again synchronized to the output bus voltage but the position of the generator rotor as a function of time has been slipped one pole with respect to its position when the generator was last connected to the output bus, and (H) repeat steps E through G until the phase criterion recited in step E is met.

8. Apparatus for synchronizing a second synchronous motor driven multi-pole synchronous generator to an AC voltage on an output bus, where the output bus voltage is supplied by a first synchronous motor driven multi-pole synchronous generator, the motors of the first and second motor driven generators are powered from a common AC power source, the first motor driven generator includes a first position indicator which provides a first indication each time the first generator rotor is at a first predetermined rotational position relative to the first generator stator, the secqnd motor driven generator having its motor and generator stators oriented so that there is at least one particular mechanical phase angle between the second generator rotor and stator at which the difference between the phase of the second motor voltage created when the second motor is driven as a generator and the phase of the source voltage is within a predetermined input phase tolerance when the difference between the phase of the second generator voltage and the phase of the output bus voltage is within a predetermined output phase tolerance, where the second motor driven generator includes a second position indicator which provides a second indication each time the second generator rotor is at a second predetermined rotational position relative to the second generator stator, and where the second predetermined rotational position is chosen so that when the first and second indications occur at the same points in time, the second generator rotor is at the particular mechanical phase angle relative to the generator stator, the apparatus comprising:

input connector means for connecting the second motor to and disconnecting the second motor from an AC power source;

output connector means for connecting the second generator to and disconnecting the second generator from the output bus;

coincidence detector means for providing an input synchronization indication when the difference between the time of occurrence of the first indication and the time of occurrence of the second indication is within a predetermined interval of time;

output phase comparator means for providing an output synchronization indication when the difference between the phase of the second generator voltage and the phase of the output bus voltage is within a predetermined output phase tolerance; and control means responsive to the coincidence detector means and the output phase comparator means to control the input and output connector means to sequentially:

(A) connect the second motor to an AC power source, (B) permit the second motor driven generator to reach operating speed, whereby the second generator produces a generator voltage having an amplitude and frequency substantially equal to the amplitude and frequency of the output bus voltage, (C) disconnect the second motor from the AC power source, whereby the second motor driven generator begins to slow down, (D) connecting the second generator to the output bus when the output synchronization signal is provided, whereby the second generator voltage is synchronized to the output bus voltage and the second generator is driven by the output bus voltage, (E) reconnect the second motor to the AC power source only if the input synchronization signal is present, whereby the second motor driven generator is synchronized both to the output bus voltage and the source voltage, (F) disconnect the second generator from the output bus if the input synchronization signal is not present, whereby the second motor dirven generator begins to slow down, (G) reconnect the second generator to the output bus when the output synchronization signal is provided, whereby the second generator voltage is again synchronized to the output bus voltage but the position of the second generator rotor as a function of time has been slipped one pole with respect to its position when the second generator was last connected to the output bus, and (H) repeat steps E through G until the phase criterion recited in step E is met.

9. Apparatus for synchronizing a second synchronous motor driven multi-pole synchronous generator to an AC voltage on an output bus, where the output bus voltage is supplied by a first synchronous motor driven multi-pole synchronous generator, the motors of the first and second motor driven generators are powered from a common AC power source, the first motor driven generator includes a first position indicator which provides a first indication each time the first generator rotor is at a first predetermined rotational position relative to the first generator stator, the second motor driven generator having its motor and generator stators oriented so that there is at least one particular mechanical phase angle between the second generator rotor and stator at which the difference between the phase of the second motor voltage created when the second motor is driven as a generator and the phase of the source voltage is within a predetermined input phase tolerance when the difference between the phase of the second generator voltage and the phase of the output bus voltage is within a predetermined output phase tolerance, where the second motor driven generator includes a second position indicator which provides a second indication each time the second generator rotor is at a second predetermined rotational position relative to the second generator stator, and where the second predetermined rotational position is chosen so that when the first and second indications occur at the same points in time, the second generator rotor is at the particular mechanical phase angle relative to the generator stator, the apparatus comprising:

input connector means for connecting the second motor to and disconnecting the second motor from an AC power source;

output connector means for connecting the second generator to and disconnecting the second generator from the output bus;

input phase comparator means for providing an input synchronization indication when the difference between the phase of the AC power source voltage and the phase of the voltage generated by the rotating second motor rotor is within a predetermined input phase tolerance;

output phase comparator means for providing an output synchronization indication when the difference between the phase of the second generator voltage and the phase of the output bus voltage is within a predetermined output phase tolerance;

coincidence detector means for providing a coincidence indication when the difference between the time of occurrence of the first indication and the time of occurrence of the second indication is within a predetermined interval of time; and control means responsive to the input and the output phase comparator means to control the input and output connector means to sequentially:

(A) connect the second motor to the AC power source;

(B) permit the second motor driven gernator to reach operating speed, whereby the second generator produces a second generator voltage having an amplitude and frquency substantially equal to the amplitude and frequency of the output bus voltage;

(C) disconnect the second motor from the AC power source if the coincidence indication is not provided, whereby the second motor driven generator begins to slow down;

(D) reconnect the second motor to the AC power source when the input synchronization indications is provided, whereby the second motor is again synchronized to the AC power source voltage but the position of the second motor rotor as a function of time has been slipped one motor pole with respect to its position when the second motor was last connected to the AC power source;

(E) repeat steps C and D until the coincidence indications is provided;

(F) disconnect the second motor from the AC power source;

(G) connect the second generator to the output bus when the output synchronization signal is provided; and (H) reconnect the second motor to the AC power source.

* * * * *